(12) United States Patent
Lim et al.

(10) Patent No.: US 10,374,767 B2
(45) Date of Patent: Aug. 6, 2019

(54) METHOD FOR TRANSMITTING FRAME TYPE INDICATION INFORMATION IN WIRELESS LAN SYSTEM AND DEVICE THEREFOR

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Hangyu Cho, Seoul (KR); Jinmin Kim, Seoul (KR); Eunsung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/767,701

(22) PCT Filed: Oct. 14, 2016

(86) PCT No.: PCT/KR2016/011522
§ 371 (c)(1),
(2) Date: Apr. 12, 2018

(87) PCT Pub. No.: WO2017/065543
PCT Pub. Date: Apr. 20, 2017

(65) Prior Publication Data
US 2018/0287755 A1  Oct. 4, 2018

Related U.S. Application Data

(60) Provisional application No. 62/246,130, filed on Oct. 26, 2015, provisional application No. 62/241,152, filed on Oct. 14, 2015.

(51) Int. Cl.
*H04B 7/06* (2006.01)
*H04L 5/00* (2006.01)
(Continued)

(52) U.S. Cl.
CPC ......... *H04L 5/0048* (2013.01); *H04B 7/0684* (2013.01); *H04L 5/00* (2013.01);
(Continued)

(58) Field of Classification Search
None
See application file for complete search history.

(56) References Cited

U.S. PATENT DOCUMENTS 10,051,687 B2 * 8/2018 Lim .................. H04L 27/26
2011/0149927 A1 * 6/2011 Stacey ............... H04L 1/0046
370/338

(Continued)

FOREIGN PATENT DOCUMENTS

| WO | 2015016684 A1 | 2/2015 |
| WO | 2015064943 A1 | 5/2015 |
| WO | 2015137618 A1 | 9/2015 |

OTHER PUBLICATIONS

IEEE 802.11-15/1122r0; Sep. 2015; Identifiers in HE PPDUs for power saving pp. 1-18.
(Continued)

*Primary Examiner* — Brian S Roberts
(74) *Attorney, Agent, or Firm* — Dentons US LLP

(57) ABSTRACT

Provided is a method for a first station (STA) transmitting a frame to a second STA in a wireless LAN system. To this end, the first STA generates a wireless frame comprising a first part (L-part) for a first-type STA and a second part (HE-part) for a second-type STA, wherein the first part comprises a legacy short training field (L-STF), a legacy long training field (L-LTF) and a legacy signaling field (L-SIG), and the length of the L-SIG is set so as to indicate that the wireless frame is a frame of different types according to the remainder when the length of the L-SIG is divided by a predetermined natural number.

15 Claims, 10 Drawing Sheets

(51) Int. Cl.
*H04W 72/04* (2009.01)
*H04L 27/26* (2006.01)

(52) U.S. Cl.
CPC ......... *H04L 27/2613* (2013.01); *H04W 72/04* (2013.01); *H04W 72/042* (2013.01)

(56) References Cited

U.S. PATENT DOCUMENTS

| | | |
|---|---|---|
| 2012/0275446 A1 | 11/2012 | Stacey et al. |
| 2013/0142095 A1 | 6/2013 | Calcev et al. |
| 2014/0307612 A1 | 10/2014 | Vermani et al. |
| 2015/0009894 A1 | 1/2015 | Vermani et al. |
| 2016/0212001 A1* | 7/2016 | Azizi ................. H04L 27/2613 |
| 2016/0323778 A1* | 11/2016 | Vermani ............ H04W 28/065 |
| 2017/0064718 A1* | 3/2017 | Bharadwaj ........ H04W 72/0493 |
| 2017/0207944 A1* | 7/2017 | Zhang .................... H04L 29/06 |

OTHER PUBLICATIONS

Y. Seok et al., "HEW PPDU Format for Supporting MIMO-OFDMA", IEEE 802.11-14/1210r1, Sep. 14, 2014, XP055229350.

* cited by examiner

FIG. 6
PPDU format (IEEE 802.11a/g)
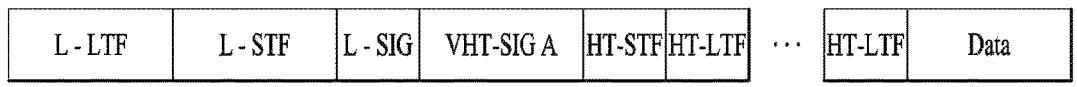
HT PPDU format (IEEE 802.11n)
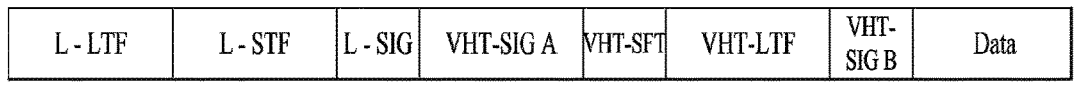
VHT PPDU format (IEEE 802.11ac)
FIG. 7
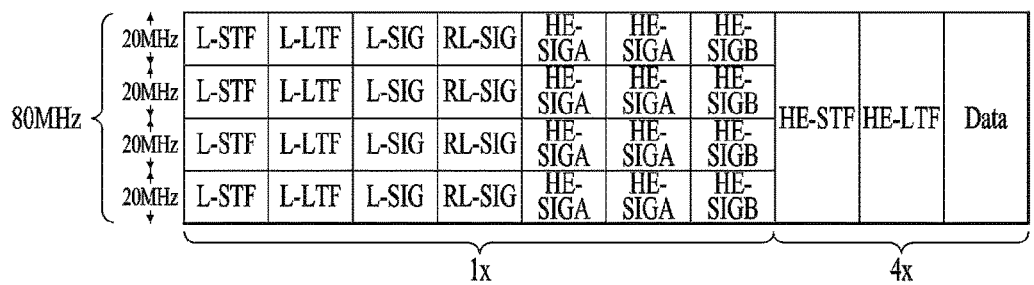

FIG. 11
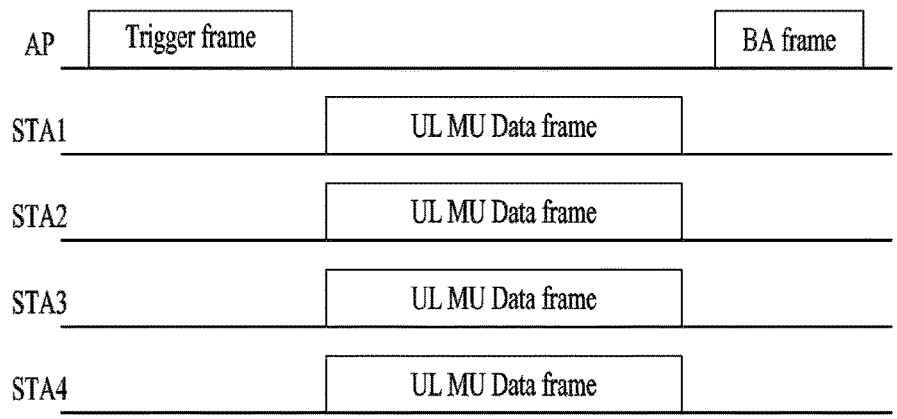
FIG. 12
| Frame control | Duration | (A1) | A2 | Common info | Per User Info 1 | ... | Per User Info N | FCS |
FIG. 13
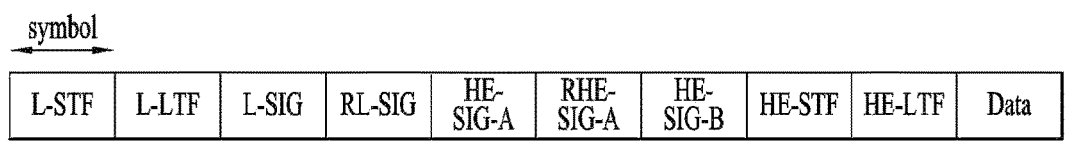

US 10,374,767 B2

METHOD FOR TRANSMITTING FRAME TYPE INDICATION INFORMATION IN WIRELESS LAN SYSTEM AND DEVICE THEREFOR

This application is a National Stage Application of International Application No. PCT/KR2016/011522, filed on Oct. 14, 2016, which claims the benefit of U.S. Provisional Application No. 62/241,152, filed on Oct. 14, 2015 and U.S. Provisional Application No. 62/246,130, filed on Oct. 26, 2015, all of which are hereby incorporated by reference in their entirety for all purposes as if fully set forth herein.

TECHNICAL FIELD

The present invention relates to a wireless LAN system, and more particularly, to a method for transmitting additional information without signaling overhead by using various structures of a frame in a wireless LAN system and a device therefor.

BACKGROUND ART

While an additional information transmission method proposed below is applicable to various types of wireless communication, a Wireless Local Area Network (WLAN) system will be described as an exemplary system to which the present invention is applicable.

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

An object of the present invention is to provide a method for efficiently transmitting additional information such as type information of a radio frame to a receiving STA without signaling overhead in a wireless LAN system.

The technical objects that can be achieved through the present invention are not limited to what has been particularly described hereinabove and other technical objects not described herein will be more clearly understood by persons skilled in the art from the following detailed description.

Technical Solution

To achieve the object of the present invention, a method for a first station (STA) to transmit a frame to a second STA in a wireless local area network (WLAN) system according to one aspect of the present invention comprises generating a radio frame including a first part (L-part) for a first type STA and a second part (HE-part) for a second type STA; and transmitting the generated frame to the second STA, wherein the first part includes a legacy short training field (L-STF), a legacy long training field (L-LTF) and a legacy signaling (L-SIG) field, and wherein a length of the L-SIG field is configured to indicate different types of the radio frame based on a remainder from a length of the L-SIG field divided by a predetermined natural number.

The first type STA may be an STA supporting an IEEE 802.11ac system and earlier versions of the IEEE 802.11ac system, and in this case, the predetermined natural number may be 3.

The length of the L-SIG field may be determined by:

$$\text{Length} = \left\lceil \frac{TXTIME - 20}{4} \right\rceil \times 3 - 3 \pm m$$

wherein the "TXTIME" indicates a predetermined length determined according to lengths of each part of the radio frame, and the 'm' may have a value indicating the type of the radio frame.

The radio frame may be a frame for the first type STA when the 'm' has a value of 0. Also, the radio frame may be a first type frame or a second type frame both for the second type STA when the 'm' has a value of 1 or 2.

The first type frame may be a general frame for the second type STA, and the second type frame may be a frame for the second type STA to communicate with a transmission rate lower than a predetermined threshold.

The first type frame may include a HE-SIG A field and a HE-SIG B field in the second part (HE-Part), and the second type frame may not include the HE-SIG B field in the second part (HE-Part).

The first type frame may include a HE-SIG A field over 2 symbols in the second part (HE-Part), and the second type frame may include the HE-SIG A field over 1 symbol in the second part (HE-Part).

The HE-SIG A field of the second type frame may be mapped on 1 symbol and repeated over 2 symbols.

The first part may include an RL-SIG field repeatedly transmitting the L-SIG field, and first indication information may additionally be transferred by using a polarity bit or a bi-polar sequence multiplied to the RL-SIG field.

The first part may include an RL-SIG field repeatedly transmitting the L-SIG field, and second indication information may additionally be transferred by using one or more bits available in the RL-SIG field when the radio frame is transmitted for the first type STA.

To achieve the object of the present invention, a station device for transmitting a frame in a wireless LAN system according to another aspect of the present invention comprises a processor configured to generate a radio frame including a first part (L-part) for a first type STA and a second part (HE-part) for a second type STA; and a transceiver configured to transmit the radio frame transferred from the processor to another station, wherein the processor generates the first part to include a legacy short training field (L-STF), a legacy long training field (L-LTF) and a legacy signaling (L-SIG) field, and wherein a length of the L-SIG field is configured to indicate different types of the radio frame based on a remainder from a length of the L-SIG field divided by a predetermined natural number.

The first type STA may be an STA supporting an IEEE 802.11ac system and earlier versions of the IEEE 802.11ac system, and the predetermined natural number may be 3.

The processor may determine a length of the L-SIG field by:

$$\text{Length} = \left\lceil \frac{TXTIME - 20}{4} \right\rceil \times 3 - 3 \pm m$$

wherein the "TXTIME" indicates a predetermined length determined according to lengths of each part of the radio frame, and the 'm' may have a specific value indicating the type of the radio frame.

The radio frame may be a frame for the first type STA when the 'm' has a value of 0, and the radio frame may be a first type frame or a second type frame both for the second type STA when the 'm' has a value of 1 or 2.

Advantageous Effects

According to one embodiment of the present invention, additional information such as type information of a radio frame may efficiently be transmitted to a receiving STA without signaling overhead in a wireless LAN system.

It will be appreciated by persons skilled in the art that the effects that could be achieved with the present invention are not limited to what has been particularly described hereinabove and other advantages of the present invention will be more clearly understood from the following detailed description.

BRIEF DESCRIPTION OF THE DRAWINGS

FIG. 6 is a diagram illustrating a frame format according to the development of a wireless LAN system.

FIG. 7 is a diagram illustrating an example of a high efficiency (HE) PPDU format according to one embodiment of the present invention.

FIG. 11 is a diagram illustrating a basic UL MU transmission procedure.

FIG. 12 is a diagram illustrating an example of a trigger frame format.

FIG. 13 is a diagram illustrating an example of a PPDU format for low rate transmission in accordance with another embodiment of the present invention.

BEST MODE FOR CARRYING OUT THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to assist understanding of the present invention, and various modifications may be made in the specific terms within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings to refer to the same or like parts.

The embodiments of the present invention can be supported by standard documents disclosed for at least one of wireless access systems, Institute of Electrical and Electronics Engineers (IEEE) 802 system, 3rd Generation Partnership Project (3GPP) system, 3GPP Long Term Evolution (3GPP LTE) system, LTE-Advanced (LTE-A) system, and 3GPP2 system. Steps or parts that are not described to clarify the technical features of the present invention can be supported by those documents. Further, all terms as set forth herein can be explained by the standard documents.

Figure 1:
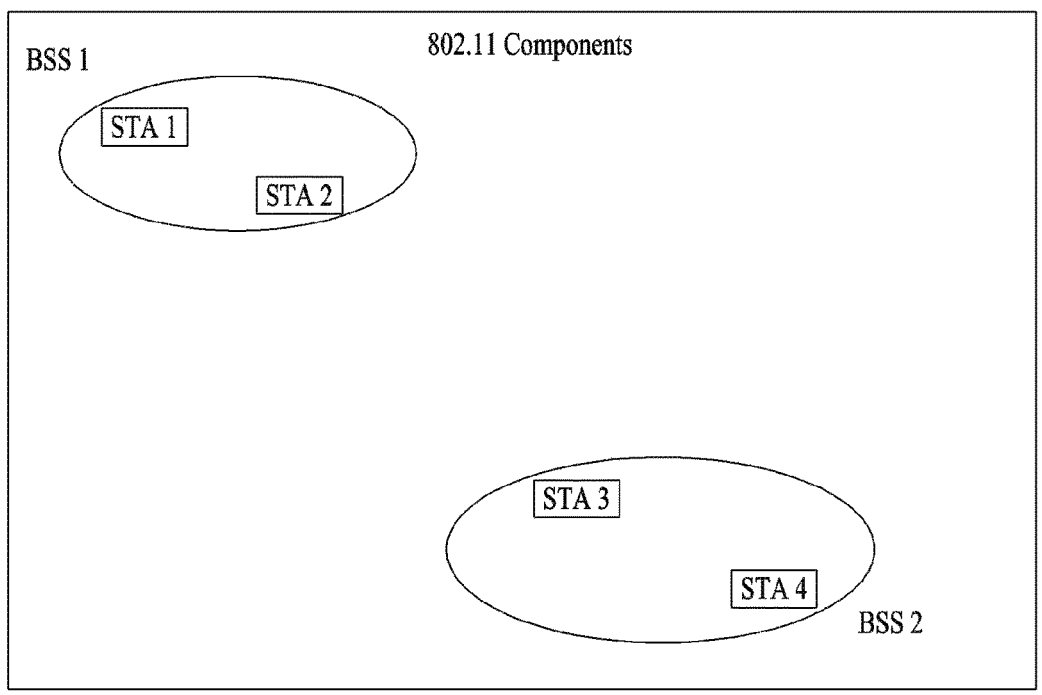
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
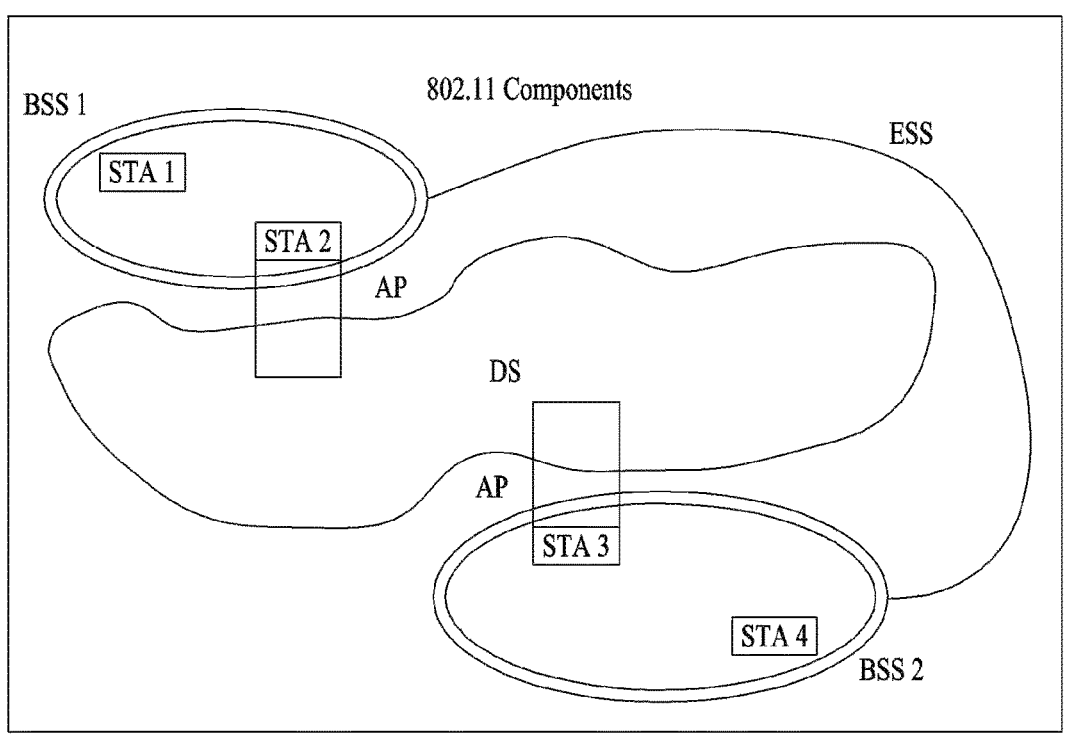
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
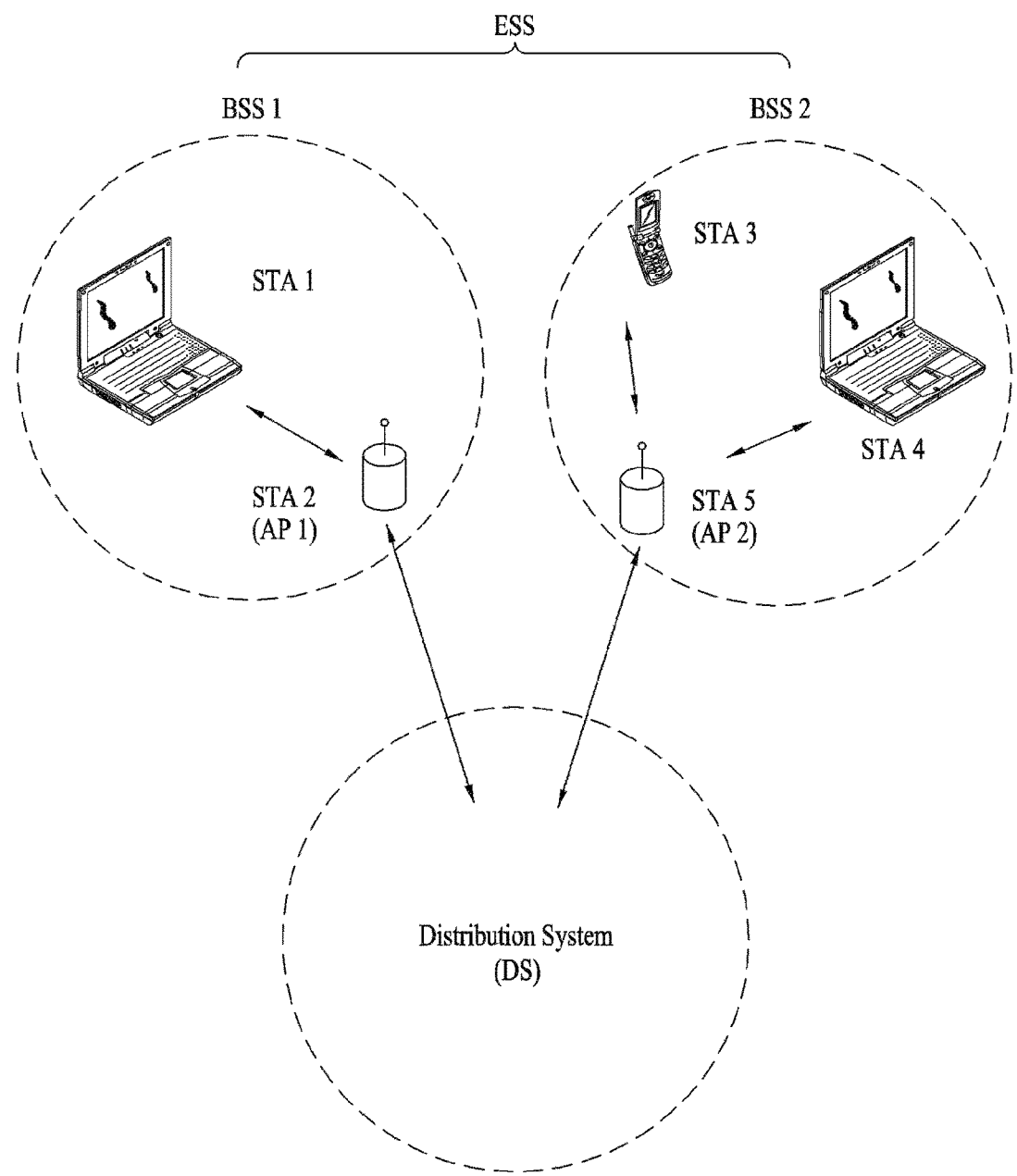
FIG. 3 is a diagram for an exemplary configuration of a WLAN system.

FIG. 3 is a diagram for an exemplary configuration of a WLAN system. FIG. 3 shows an example of a base structure BSS including a DS.

According to an example shown in in FIG. 3, a BSS1 and a BSS 2 construct an ESS. In a WLAN system, an STA corresponds to a device operating according to MAC/PHY regulation of IEEE 802.11. An STA includes an AP STA and a non-AP STA. In general, the non-AP STA corresponds to such a device directly handled by a user as a laptop computer, a mobile phone and the like. In the example of FIG. 3, an STA 1, an STA 3 and an STA 4 correspond to the non-AP STA and an STA 2 and an STA 5 correspond to the AP STA.

In the following description, the non-AP STA may be referred to as a terminal, a WTRU (wireless transmit/receive unit), a UE (user equipment), an MS (mobile station), a mobile terminal, an MSS (mobile subscriber station) and the like. And, an AP is a concept corresponding to a BS (base station), a Node-B, an eNB (evolved Node-B), a BTS (base transceiver system), a femto BS, and the like in a different wireless communication field.

Figure 4:
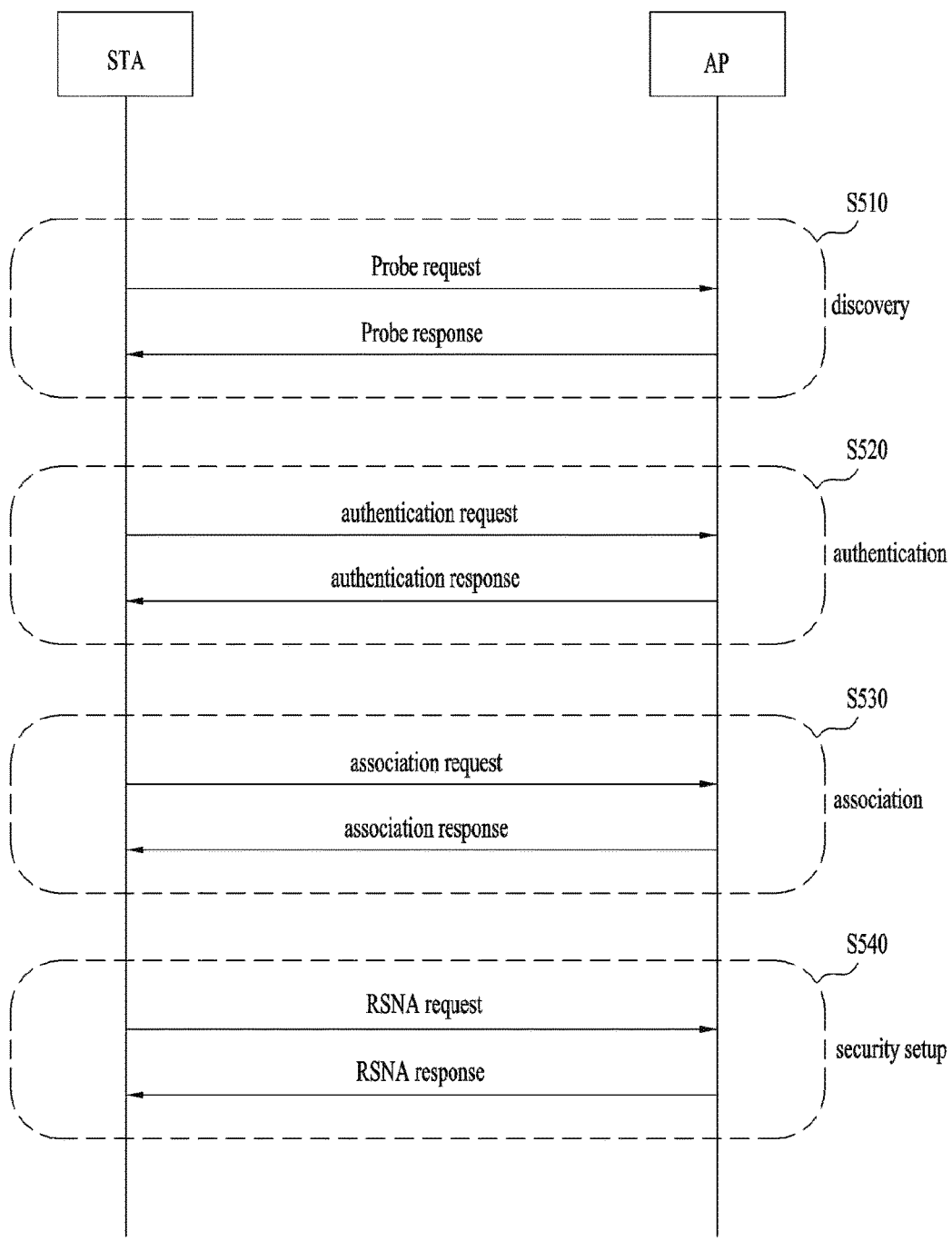
FIG. 4 is a diagram for explaining a general link setup procedure.
Figure 5:
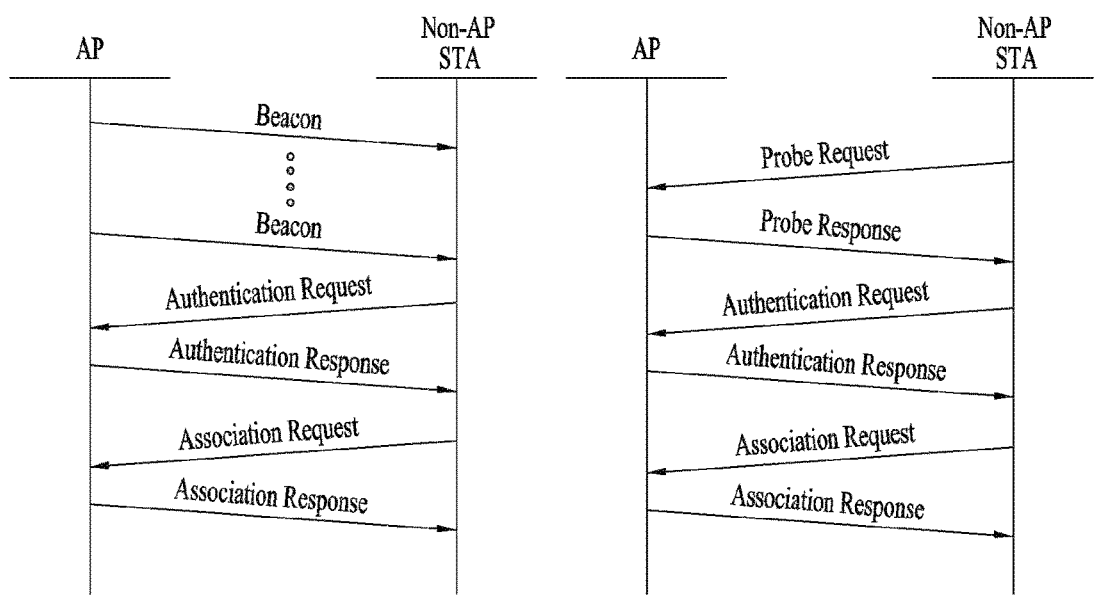
FIG. 5 is a diagram for explaining an active scanning method and a passive scanning method.

FIG. 4 is a diagram for explaining a general link setup procedure and FIG. 5 is a diagram for explaining an active scanning method and a passive scanning method.

In order for an STA to setup a link with a network and transceive data with the network, it is necessary for the STA to firstly discover the network, perform authentication, establish an association, and perform an authentication procedure for security and the like. A link setup procedure can also be referred to as a session initiation procedure or a session setup procedure. And, discovery of the link setup procedure, authentication, association, and security setting procedure can be commonly referred to as an association procedure.

An exemplary link setup procedure is explained with reference to FIG. 4.

In the step S410, an STA can perform a network discovery operation. The network discovery operation can include a scanning operation of the STA. In particular, in order for the STA to access a network, it is necessary to find out a network in which the STA is able to participate. An STA should identify a compatible network before the STA participates in a wireless network. A procedure of identifying a network existing at a specific region is referred to as scanning.

A scanning scheme includes active scanning and passive scanning. Although FIG. 4 shows a network discovery operation including an active scanning procedure for example, the network discovery operation can operate as a passive scanning procedure.

According to the active scanning procedure, an STA performing scanning transmits a probe request frame to discover an AP existing near the STA while changing channels and waits for a response in response to the probe request frame. A responder transmits a probe response frame to the STA, which has transmitted the probe request frame, in response to the probe request frame. In this case, the responder may correspond to an STA, which have finally transmitted a beacon frame in a BSS of a scanning channel. Since an AP transmits the beacon frame in the BSS, the AP becomes the responder. However, since a beacon frame is alternately transmitted by STAs in an IBSS, a responder is not fixed. For example, if an STA transmits a probe request frame on a first channel and receives a probe response frame on the first channel, the STA stores BSS-related information included in the received probe response frame and may be then able to perform scanning (i.e., transmit and receive probe request/response on a second channel) using an identical method by moving to a next channel (e.g., second channel).

Referring to FIG. 5, a scanning operation can be performed using a passive scanning scheme. In the passive scanning, STAs performing the scanning wait for a beacon frame while moving around channels. The beacon frame corresponds to one of management frames in IEEE 802.11. The beacon frame is periodically transmitted to notify the existence of a wireless network and make an STA performing scanning discover the wireless network and participate in the wireless network. An AP performs a role of periodically transmitting the beacon frame in a BSS and STAs belonging to an IBSS alternately transmit the beacon frame in the MSS. Having received the beacon frame, the STA performing scanning stores information on a BSS included in the beacon frame and records beacon frame information at each channel while moving to a different channel. Having received the beacon frame, the STA stores BSS-related information included in the beacon frame, moves to a next channel, and may be then able to perform scanning at the next channel using an identical method.

If the active scanning and the passive scanning are compared with each other, the active scanning has a merit in that delay and power consumption are less compared to the passive scanning.

After the network is discovered by the STA, an authentication procedure can be performed in the step S420. In order to clearly distinguish the authentication procedure from a security setup operation described in the step S440, the authentication procedure can be referred to as a first authentication procedure.

An authentication procedure includes procedures that an STA transmits an authentication request frame to an AP and the AP transmits an authentication response frame to the STA in response to the authentication request frame. An authentication frame used for authentication request/response corresponds to a management frame.

An authentication frame can include information on an authentication algorithm number, an authentication transaction sequence number, a status code, a challenge text, an RSN (robust security network), a finite cyclic text, and the like. The aforementioned information corresponds to a part of information capable of being included in the authentication request/response frame. The information can be replaced with other information or additional information can be further included in the information.

The STA can transmit the authentication request frame to the AP. The AP can determine whether to permit authentication for the STA based on information included in the received authentication request frame. The AP can provide a result of the authentication process to the STA via the authentication response frame.

After the STA is successfully authenticated, an association procedure can be performed in the step S430. The association procedure includes procedures that the STA transmits an association request frame to the AP and the AP transmits an association response frame to the STA in response to the association response frame.

For example, the association request frame can include information on various capabilities, information on a beacon listening interval, information on an SSID (service set identifier), information on supported rates, information on supported channels, information on an RSN, information on a mobility domain, information on supported operating class, information on a TIM (traffic indication map) broadcast request, information on interworking service capability, and the like.

For example, the association response frame can include information on various capabilities, information on a status code, information on an AID (association ID), information on supported rates, information on an EDCA (enhanced distributed channel access) parameter set, information on an RCPI (received channel power indicator), information on an RSNI (received signal to noise indictor), information on a mobility domain, information on a timeout interval (association comeback time), information on an overlapping BSS scan parameter, information on a TIM broadcast response, information on a QoS map, and the like.

The aforementioned information corresponds to a part of information capable of being included in the association request/response frame. The information can be replaced with other information or additional information can be further included in the information.

After the STA is successfully associated with the network, a security setup procedure can be performed in the step S540. The security setup procedure of the step S440 may correspond to an authentication procedure authenticated via an RSNA (robust security network association) request/response, the authentication procedure of the step S520 may correspond to a first authentication procedure, and the security setup procedure of the step S540 can be simply referred to as an authentication procedure.

The security setup procedure of the step S540, for example, can include a procedure for performing private key setup via 4-way handshaking through an EAPOL (extensible authentication protocol over LAN) frame. And, the security setup procedure can also be performed according to a security scheme not defined in IEEE 802.11 standards.

FIG. 6 is a diagram illustrating a frame format according to the development of a wireless LAN system.

First of all, a PPDU format in a system according to IEEE 802.11a or g is shown on a top end of FIG. 6. PPDU in the IEEE 802.11a/g system may include L-LTF, L-STF, L-SIG and data field as shown in FIG. 6.

Meanwhile, as an improved model of the IEEE 802.11a/g system, IEEE 802.11n system uses HT PPDU as shown in FIG. 6. The HT PPDU additionally includes HT field in PPDU configuration of the IEEE 802.11a/g system, wherein the HT field may include HT-STF, HT-LTF, etc.

Also, IEEE 802.11ac system which is an improved model of the IEEE 802.11n system may use a VHT PPDU format as shown in FIG. 6. The VHT PPDU may additionally include VHT fields as shown in FIG. 6.

Although a frame structure for IEEE 802.11ax has not yet been determined, the frame structure is predicted as follows.

FIG. 7 is a diagram illustrating an example of a high efficiency (HE) PPDU format according to one embodiment of the present invention.

11ax may use a frame structure that maintains the legacy 1x symbol structure (3.2 us) for HE-SIG(SIG-A, SIG-B) and has a 4x symbol (12.8 us) structure for HE-preamble and Data part like the frame structure shown in FIG. 7. There is no problem in application of the present invention even though the aforementioned structure is changed unless the aforementioned structure is directly conflict with the following description.

L-part may follow configurations of L-STF, L-LTF, and L-SIG as it is maintained in the legacy WiFi system. It is preferable that L-SIG generally transfer packet length information. HE-part is newly configured for 11ax standard (High Efficiency). HE-SIG(HE-SIGA and HE-SIGB) may exist between the L-part and HE-STF, and may indicate common control information and user specific information. Specifically, HE-SIG may include HE-SIG A for transferring common control information and HE-SIG B for transferring user specific information.

Meanwhile, various formats may be used in the HE system.

For example, the general PPDU format shown in FIG. 7 indicates a general format that may be used even for multi-user transmission, and may not include HE-SIG B field that includes information per STA in case of SU transmission. Also, to replace IEEE 802.11b and support IoT(Internet of Things) as described later, a specific type PPDU format in which overhead is minimized may be used.

Therefore, a method for efficiently notifying a receiver of various radio frame formats in an HE system without additional signaling overhead will be described below.

Figure 8:
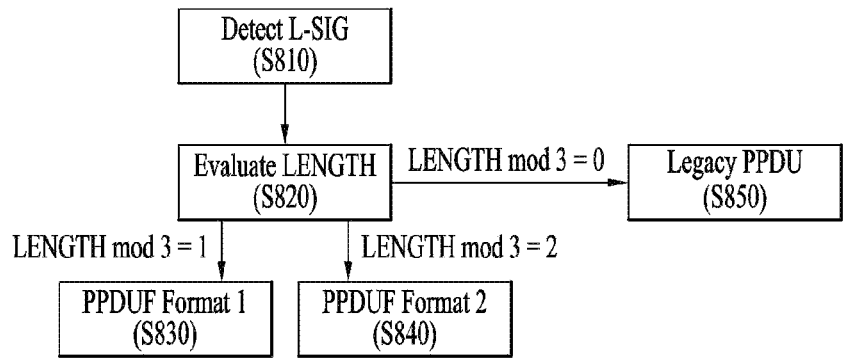
FIG. 8 is a diagram illustrating a method for notifying a format of a radio frame using a length of L-SIG field in accordance with a preferred embodiment of the present invention.

FIG. 8 is a diagram illustrating a method for notifying a format of a radio frame using a length of L-SIG field in accordance with a preferred embodiment of the present invention.

In the present invention, a length of a length field of L-SIG field is set to a value divisible by 3 in the 11ac system. The length field of the L-SIG field in the 11ac system is defined as follows.

$$\text{L\_LENGTH} = \left\lceil \frac{TXTIME - 20}{4} \right\rceil \times 3 - 3 \qquad \text{[Equation 1]}$$

In this case, TXTIME is a parameter determined in accordance with a length of each part of the radio frame, and is defined as follows if Short Guard Interval is used.

$$TXTIME(\text{for } SGI) = T_{LEG\_PREAMBLE} + T_{L\text{-}SIG} + T_{VHT\text{-}SIG\text{-}A} + \qquad \text{[Equation 2]}$$

$$T_{VHT\_PREAMBLE} + T_{VHT-SIG-B} + T_{SYM} \times \left\lceil \frac{T_{SYMS} \times N_{SYM}}{T_{SYM}} \right\rceil$$

In the Equation 1, the length of the L-SIG field in the 11ac system has no option but to have a length of a value divisible by 3 in the 11ac system regardless of the fact how TXTIME according to the Equation 2 is defined.

However, as described above, it is not required that the length of the L-SIG field should be fixed to a multiple of 3 in the 11ax system. Therefore, in one embodiment of the present invention, various PPDU format are set in the HE system using the remainder obtained by dividing the length of L-SIG by a predetermined natural number, for example, 3.

That is, as shown in FIG. 8, STA that has received PPDU may first detect L-SIG included commonly regardless of the PPDU format (S810). The STA determines a length of the detected L-SIG field (S820), and if the length of the L-SIG field satisfies 'LENGTH mod 3=1', the STA may assume and process that the received PPDU has Format 1 (S830). Also, if the length of the L-SIG field satisfies 'LENGTH mod 3=2', the STA may assume and process that the received PPDU has Format 2 (S840). Also, if the length of the L-SIG field satisfies 'LENGTH mod 3=0', the STA may assume and process that the received PPDU is PPDU according to the legacy system (S850).

In the aforementioned embodiment, the length of the L-SIG field may be set as follows in view of the STA that transmits a frame.

$$\text{Length} = \left\lceil \frac{TXTIME - 20}{4} \right\rceil \times 3 - 3 \pm m \quad \text{[Equation 3]}$$

In this case, the parameter 'TXTIME' is a parameter defined like the example of the Equation 2, and may indicate a format of PPDU, which is transmitted in accordance with a value of 'm' of the above Equation. That is, the parameter may indicate that the corresponding PPDU is a legacy PPDU if 'm' is 0, the corresponding PPDU is a first type PPDU if 'm' is 1, and the corresponding PPDU is a second type PPDU if 'm' is 2. In the above Equation 3, '+' and '−' may be defined selectively in accordance with a status.

In the aforementioned description, for example, the first type PPDU may be an HE MU PPDU, and the second type PPDU may be an HE SU PPDU. Also, as described later, the first type PPDU may be a general PPDU format, and the second type PPDU may be a PPDU format for IoT support.

Hereinafter, a new PPDU format for low rate transmission for supporting IoT will be described.

Row Rate Transmission PPDU Format

Figure 9:
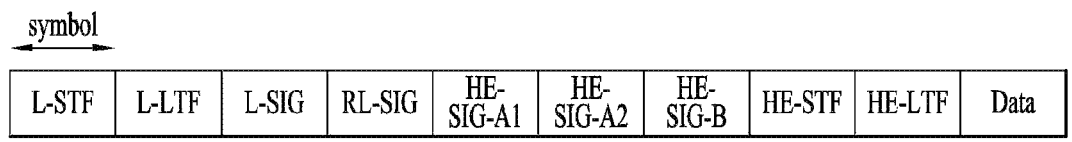
FIG. 9 is a diagram illustrating a general PPDU format of a symbol unit in an HE system in accordance with one embodiment of the present invention.

FIG. 9 is a diagram illustrating a general PPDU format of a symbol unit in an HE system in accordance with one embodiment of the present invention.

As described above, in FIG. 9, 11ax frame uses a frame structure that maintains the legacy 1x symbol structure (3.2 us) for HE-SIG(SIG-A, SIG-B) and has a 4x symbol (12.8 us) structure for HE-preamble and Data part like the frame structure.

L-part follows configurations of L-STF, L-LTF, and L-SIG as it is maintained in the legacy WiFi system. L-SIG transfers packet length information, and may be repeatedly transmitted in 11ax to enhance reliability for L_SIG.

FIG. 9 illustrates that HE-SIG A field for transmitting common control information for STA is transmitted through 2 symbols.

The 11ax frame defined as shown in FIG. 9 may be defined as a low rate frame format as follows by changing some fields to support a low rate, for example, 1 Mbps or less (IoT).

Figure 10:
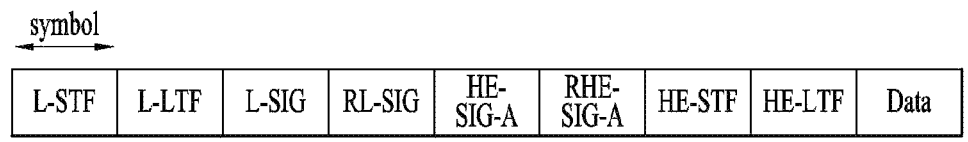
FIG. 10 is a diagram illustrating a low rate frame format according to one embodiment of the present invention.

FIG. 10 is a diagram illustrating a low rate frame format according to one embodiment of the present invention.

As shown in FIG. 10, a low rate frame format may be defined based on SU-PPDU format of 11ax to support low data rate/IoT. Therefore, HE-SIG-B including user specific information for STAs may be excluded from frame configuration.

Also, time/frequency repetition may be performed for improvement of performance for SIG field (L-SIG, HE-SIGA) and range extension. That is, unlike 11ax that includes HE-SIG-A and HE-SIG-B of 2 symbols to transmit data using multiple STAs and wide bandwidth, HE-SIG-A to which common information is transmitted for low rate transmission may be optimized for 1 symbol and time/frequency-repeated for robustness, and information on HE-SIG-B for transmitting user specific information may be omitted.

Meanwhile, the aforementioned low rate transmission may performed using a trigger frame as described later.

The trigger frame is generally used for UL MU transmission. To this end, a basic UL MU transmission procedure will be described as follows.

FIG. 11 is a diagram illustrating a basic UL MU transmission procedure.

The UL MU transmission procedure includes that AP commands STAs, which will use UL MU, to prepare UL MU, receives UL MU data frame and transmits ACK. An adjustment procedure for correcting a time, frequency or power error may be included between the STAs for UL MU.

In FIG. 11, operation for each frame is as follows.

<UL MU Trigger Frame>

FIG. 12 is a diagram illustrating an example of a trigger frame format.

STAs which will transmit UL MU data are commanded to prepare the trigger frame. STA ID or address, a resource region (subcarriers in case of OFDMA, and stream index in case of MIMO) which will be used, frame/length/TXOP duration, etc. may be notified. In more detail, MCS and coding, which should be used for each STA, may be designated.

Since the trigger frame has a frame structure starting from L-part (Legacy STF, LTF, SIG, etc.), the trigger frame may allow the legacy STAs to perform NAV setting through L-SIG protection.

<UL MU Data Frame>

Each STA transmits UL MU data frame in accordance with scheduling information. This frame may be configured as a new MAC frame structure even without L-part. Alternatively, the L-part may be transmitted in the form of SFN (that is, all STAs simultaneously transmit the same L-part configuration), and may be configured subsequently to the new MAC frame structure. If data frame is sufficiently configured as information of UL trigger frame, HE-SIG (region for transmitting control information on a configuration system of data frame) may not be required.

<ACK/BA Frame>

If the legacy ACK/BA frame structure is used as it is, AID (or partial AID) of MU STAs may be included in RA 6 octets. Alternatively, if a new ACK frame is configured, the new ACK frame may be configured in the form of SU or MU. If the corresponding frame includes STA ID or follows the order mentioned in the UL MU scheduling frame, the frame may be omitted. Alternatively, a new ACK frame may be configured without L-part. Whether reception has been successfully performed may be notified through ACK (or NACK). If NACK is included in the corresponding frame, the reason why that NACK is included in the corresponding frame or information on next procedure (re-scheduling, etc.) may be included in the corresponding frame. Also, a control frame for next allocation scheduling by extending TXOP, such as next UL MU scheduling information, or a control frame such as adjustment for next UL MU may be included in the corresponding frame.

One embodiment of the present invention suggests that the trigger frame is used for the aforementioned low rate transmission.

Similarly to UL MU data transmission of flax, the AP transmits a trigger frame for low rate transmission, and the STAs that have transmitted the trigger frame may perform low rate data transmission by using the received scheduling information. At this time, the STAs may simultaneously transmit data, or may transmit data after receiving a polling frame transmitted by the AP that has received the trigger frame. Also, since robust data transmission is performed at a low rate, the AP may not transmit, to the STA, ACK information on data received after receiving the above information.

The trigger frame used for low rate transmission may be transmitted using the legacy frame format or 11ax frame format. Also, since data are transmitted to the resource allocated using the scheduling information and transmission information of the trigger frame, the low rate frame transmitted by the STA does not include HE-SIG-B that includes user specific information, whereby overhead may be reduced.

Since data are transmitted using the scheduling information transmitted through the legacy trigger frame, for low rate transmission, the low rate transmission frame transmitted by the STA may allow data to be transmitted immediately after the legacy part. For example, the frame may include L-STF, L-STF, L-SIG, and data. Also, RL-SIG may be added to the frame structure. In this way, since data may be transmitted immediately without additional HE-part, preamble overhead may be reduced additionally.

Also, to use 4× numerology changed in the above structure, the frame for low rate transmission may be configured such that HE-STF and HE-LTF for channel estimation and minimum AGC are transmitted together.

That is, in FIG. 9, HE-SIG-A and HE-SIG-B may be transmitted using a structure excluded from the frame structure. That is, a frame format comprised of L-STF, L-STF, L-SIG, RL-SIG, HE-STF, HE-LTF, and data may be used.

As another configuration example, since the legacy trigger is used, a structure from which RL-SIG is omitted, that is, a frame format comprised of L-STF, L-LTF, L-SIG, HE-STF, HE-LTF, and data may be used.

Unlike the aforementioned case, if 11ax frame format is used as the trigger frame format, the frame comprised of HE-STF, HE-LTF, and data without including the Legacy part may be transmitted. That is, a green field frame format for low rate transmission may be configured and used.

In addition to reducing overhead of the frame using various frame formats such as the trigger frame, since the STA may transmit a signal at a given time without contention with the other STAs by using a resource allocated in accordance with scheduling information of the trigger frame, additional channel scanning may not be required, whereby power consumption may be reduced.

If low transmission is performed using the trigger frame as above, the following methods may be used for low data rate transmission.

<Method for Performing Transmission using OFDMA Resource Unit>

11ax may use RU size as follows with respect to a bandwidth to support OFDMA.

RU size that may be supported is varied depending on bandwidth but RU defined in 11ax may be configured as follows.
 *26-tone with 2 pilots
 *52-tone with 4 pilots
 *106-tone with 4 pilots
 *242-tone with 8 pilots
 *484-tone with 16 pilots
 *996-tone with 16 pilots (note that 996-tone is defined for 80 MHz HE-SA-PPDU or 80 MHz HE-SA-MU-PPDU)

For low rate data transmission, data may be used using RU of small RU size, for example, RU comprised of 26/52 tone, among various RUs defined as above. Also, to enhance reliability for the transmitted data, the STA may transmit data through duplication in a unit of RU size allocated within a bandwidth.

For example, if low rate transmission is performed at 20 MHz, STA which is allocated with 26 tone RU may acquire gain of 9 times, that is, 10 dB information by performing duplication for data in view of frequency through the other eight 26 RUs in addition to the RU.

Also, if the same data are repeated continuously, PAPR is increased in the OFDM system. Therefore, to reduce this tendency, the following sequence may be carried in RU subjected to duplication and then transmitted.

The sequence multiplied to Dup-RU may be comprised of CAZAC sequence that may reduce PAPR. At this time, the number of given sequences may be the same as the number of small RUs, or one sequence may be defined.

If sequences are configured as a set, given sequences may be multiplied per dup-RU and then transmitted, or a specific sequence of the set may be selected and multiplied to RU and then transmitted.

One given sequence may be cyclic-shifted per duplication and then applied to RU subjected to duplication.

In 11ah, XOR may be applied one given sequence and dup-RB like repetition for MCS10.

As another method, the sequence applied to duplication may be applied to only even/odd RU indexes and then transmitted.

As still another method, bipolar sequence +1/−1 may be multiplied per RU and then transmitted.

As described above, in order that data may be carried in small RU and then transmitted through duplication, corresponding information may be transmitted as follows through the trigger frame.

A trigger frame type for low rate transmission may be defined such that data are transmitted using information included in the low rate transmission trigger type.

In the trigger frame format, trigger information and indication information on low rate transmission may be carried in the control information, and RA information (26 tone/52 tone) and duplication information (ex. indication of duplication, number of duplication, sequence info for dup) may be included in per user information.

If the trigger frame uses 11ax frame format, indication for low rate transmission may be performed through the aforementioned embodiment or a method disclosed in the following embodiment.

Information may be transmitted by being repeated within a given bandwidth or resource size defined differently from the method for transmitting data at a low rate by performing repetition for a resource unit. For example, if transmission is performed through 20 MHz, MCS0 is assumed. In this case, coded bits of 234 length may be transmitted. If coded bits of low rate data are 26, the transmitted information may be repeated 9 times at 20 mhz. Therefore, repetition gain such as duplication of the RU may be obtained, whereby data may be transmitted more robustly, and a transmission range may also be enlarged.

Information on the information repetition may be transmitted through the trigger frame as above, and is transmitted by using a trigger frame type configured for low rate transmission or carrying repetition information (indication of info repetition, number of repetition, info of repetition sequence, and repetition length) in user specific information of the trigger frame.

As another method, a low MCS for low rate transmission may be configured like MCS10, whereby information may be transmitted through repetition by using the MCS. The MCS for low rate transmission is transmitted through per user information of the trigger frame. At this time, the MCS for a low rate may perform repetition by applying a sequence (for example, the sequence may be set to 13/26 if the smallest RU size transmission is assumed) defined at a certain length like MCS10.

As a method different from the aforementioned embodiment, the STA may perform low rate transmission by using MU frame without using the trigger frame. At this time, the frame format of 11ax may be configured as follows to reduce preamble overhead.

FIG. 13 is a diagram illustrating an example of a PPDU format for low rate transmission in accordance with another embodiment of the present invention.

As shown in FIG. 13, HE-SIG-A includes 2 symbols like the legacy 11ax frame but its information is transmitted in a unit of one symbol during low rate transmission, the other one symbol is configured such that HE-SIG-A is repeated. At this time, HE-SIG-A symbols may be repeated using the following methods.

Interleaving is performed for the HE-SIG-A symbols, whereas repeated RHE-SIG-A is repeated without interleaving.

Bipolar sequence +1/−1 or a given bipolar sequence equal to a symbol length may be multiplied to RHE-SIG-A and then repeated.

Additional information may be transmitted using the bipolarization.

As described above, HE-SIG-B may be comprised of one symbol, and may be transmitted using MCS lower than MCS0 for robust transmission. The STA transmits information on low rate transmission by carrying the information in HE-SIG-B. At this time, the transmitted information may be configured as follows.

*Indication of repetition, repetition type (ex. Based Information or RU), number of repetition, repetition sequence info)

The indication on the low rate transmission may be performed through the method disclosed in the aforementioned embodiment or the following embodiment.

As a frame configuration different from the configuration of FIG. 13, information on repetition may be indicated by HE-SIG-A, whereby low rate transmission may be performed using the structure from which HE-SIG-A is omitted.

As another configuration method for SIG of FIG. 13, HE-SIG-A may be comprised of 1.5 symbol, and may be comprise of 3 symbols for robust transmission through repetition/ low MCS application.

HE-SIG-A transmitted in a unit of 1.5 symbol includes user specific information, and at this time, HE-SIG-B may be omitted from the frame configuration. The HE-SIG-A is transmitted by including repetition related information, for example, repetition information transmitted through He-SIG-B in the structure of FIG. 13.

RU and data repetition method for performing low rate transmission suggested as above may be used for the other frame format as well as the MU frame format.

Since the frame of 11ax for low rate transmission is different from the legacy frame structure as above, the STAs need indication for quickly recognizing the difference, and may previously recognize the frame format for low rate transmission through the indication as described above during low rate transmission in 11ax.

That is, if the value of 'm' is 1 in the Equation 3, it may indicate PPDU for 11ax transmission. On the other hand, if the value of 'm' is 2, it may indicate low rate PPDU (or SU PPDU) as shown in FIG. 10. Also, various PPDU formats based on low rate transmission may be indicated using the value of 'm'.

Meanwhile, the aforementioned PPDU format indication method is not the only example, and may indicate a PPDU format in accordance with the following various methods. Also, the following examples may be used for transmission of various kinds of additional information as well as PPDU format.

Various Methods for PPDU Format Indication

<Indication Method Based on Polarity of RL-SIG>

In 11ax, L-SIG is repeatedly transmitted for robust transmission of L-SIG. At this time, −1/+1 bi-polar sequence may be multiplied to RL-SIG symbol which is repeated. Therefore, it is possible to determine whether the corresponding frame is a first type frame (for example, 11ax frame) or a second type frame (for example, frame for low rate transmission) by using polarity bits multiplied to RL-SIG, for example, −1/+1 information as described above. Also, it is noted that configuration information of SIG field, for example, HE-SIG-A may be comprised of one symbol and repeatedly transmitted.

As another method, RL-SIG length or given bi-polar sequence corresponding to ½, ¼, ⅛ length may be multiplied to repeated L-SIG, whereby RL-SIG may be transmitted. At this time, it is possible to determine whether the corresponding frame structure is for 11ax transmission or low rate transmission, depending on that the sequence has been transmitted or inverse sequence has been transmitted. Also, the STA may previously know that configuration information of HE-SIG-A and HE-SIG-B are not transmitted, by using the above indication.

As still another method, indication may be considered in such a manner that polarity bit or sequence may be multiplied to pilot of L-SIG symbol not the entire L-SIG symbols. For example, L-SIG transmits two pilots, and at this time, polarity bit (ex. −1, +1) or polarity sequence of 2 bits may be multiplied to the pilots, whereby it is noted that the frame received by the STA is transmitted to 11ax or transmitted for low rate support.

In the aforementioned description, the low rate transmission frame type has been indicated using the polarity bit.

However, the same method may be used to indicate another PPDU format or additional information.

<Indication Method Using Piggybacked Bit or Additional Bit of RL-SIG>

In FIG. 9, L-part(L-STF, L-STF, L-SIG) is transmitted using the frame structure of 11a, and at this time, a total number of subcarriers used at 20 MHz is 52. In this case, 4 subcarriers for pilot transmission are excluded from the total of subcarriers, and 48 carriers are used for data transmission. However, RL-SIG repeated in FIG. 9 may be transmitted using the frame structure of 11ac. At this time, the number of subcarriers used for data transmission is 52.

Therefore, RL-SIG may further use 4 subcarriers, and information of maximum 2 bits may additionally be transmitted on the assumption of MCS0 as compared with the legacy L-SIG. Therefore, if RL-SIG is transmitted using the frame format of 11ac not 11a as described above, it is possible to indicate whether the frame transmitted to the RL-SIG using piggybacked/added bit is an 11ax frame structure or a frame structure for low rate transmission.

For example, if 1 bit is transmitted, the 11ax frame structure may be recognized in case of 0, and the frame for low rate transmission may be recognized in case of 1. This is only one example, and a reverse indication may be performed.

For another example, if 2 bits are transmitted, one of information of 2 bits (for example, 00, 01, 10 and 11) may be allocated as indication for low rate transmission.

Indication for low rate transmission may be performed using added/piggybacked bit information transmitted through RL-SIG as above, and it may be indicated that the transmitted frame is configured as shown in FIG. 10.

In the aforementioned description, the low rate transmission frame type has been indicated using the polarity bit. However, the same method may be used to indicate another PPDU format or additional information.

<Indication Method Using HE-SIG-A Repetition and Polarity>

The frame structure of 11ax includes HE-SIG-A 2 symbols as shown in FIG. 9. However, HE-SIG-A is comprised of one symbol during low rate transmission as shown in FIG. 10, and this symbol may be repeatedly transmitted by time/frequency. At this time, the repeated HE-SIG-A symbol may be transmitted by being multiplied by −1/+1 bi-polar sequence like RL-SIG symbol. Therefore, the STA that has received the frame may identify whether the received HE-SIG-A symbol has been repeated, by using the polarity bit, for example, +1/−1 information. As a result, it is noted that HE-SIG-A has been transmitted in a unit of one symbol and the corresponding frame is intended for low rate transmission.

As another method, he-SIG-A is transmitted by multiplying the length of HE-SIG A by the given bi-polar sequence corresponding to ½, ¼, ⅛ length. At this time, it is noted that the corresponding frame is for low rate transmission or 11ax frame depending on whether HE-SIG-A has been repeatedly transmitted by the sequence or inverse sequence. Also, information on the frame may be acquired through the above information.

<Indication Method Using L-SIG Field Information>

Figure 14:
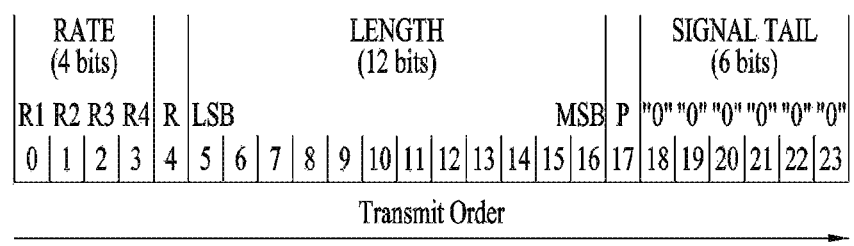
FIG. 14 is a detailed diagram illustrating a configuration of L-SIG field.

FIG. 14 is a detailed diagram illustrating a configuration of L-SIG field.

The L-SIG field may be configured as shown in FIG. 14, a reserved bit of 1 bit, that is, a bit which is not defined, exists among information of 24 bits. The bit is always set to 0 for the legacy STA, and the legacy STA disregards the above information during reception. Therefore, information of the fourth bit of the L-SIG field is transmitted by being set to a value not 0, that is, 1, whereby the 11ax STA may identify that the transmitted frame is for low rate transmission and previously identify that a preamble structure described as an example is used.

As another method, indication may be performed using a parity bit not the reserved bit. For example, the 17th bit of L-SIG is transmitted for parity check for bits 0 to 16, and at this time, the above value is always set to a positive value. Therefore, the parity bit of L-SIG may be transmitted as a negative value during low rate transmission, whereby the STA may be indicated that the transmitted frame is the frame for low rate transmission.

Figure 15:
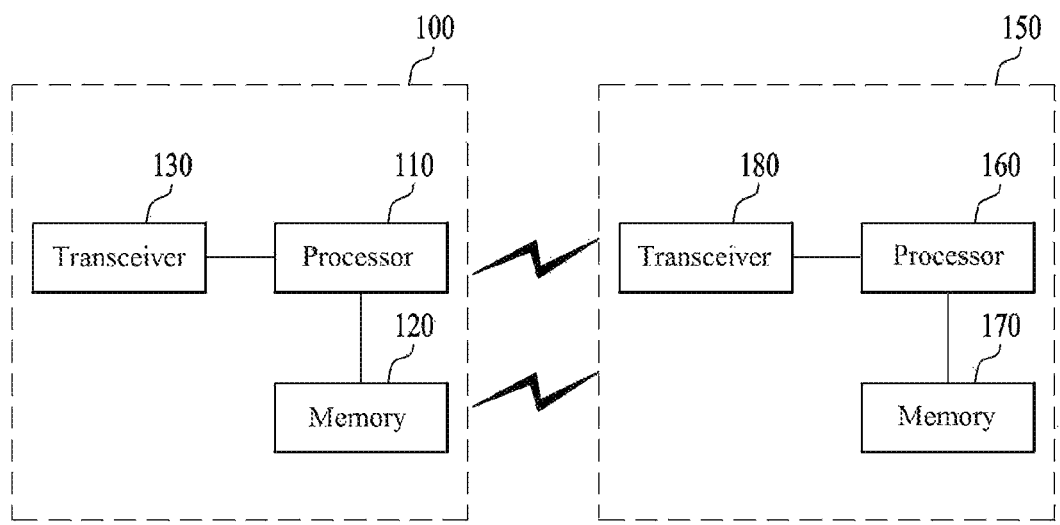
FIG. 15 is a block diagram illustrating an exemplary configuration of an AP device (or base station) and a station device (or UE) according to one embodiment of the present invention.

FIG. 15 is a block diagram for an exemplary configuration of an AP (or a base station) and an STA (or a UE) according to one embodiment of the present invention.

An AP 100 can include a processor 110, a memory 120, and a transceiver 130. An STA 150 can include a processor 160, a memory 170, and a transceiver 180.

The transceiver 130/180 can transmit/receive a radio signal and implement a physical layer according to IEEE 802 system. The processor 110/160 is connected with the transceiver 130/180 and can implement a physical layer and/or a MAC layer according to IEEE 802 system. The processor 110/160 is configured to perform an operation according to one or a combination of two or more embodiments of the present invention. A module for implementing operations of the AP and the STA according to the various embodiments of the present invention is stored in the memory 120/170 and the module can be executed by the processor 110/160. The memory 120/170 can be connected with the processor 110/160 via a well-known media in a manner of being included in the processor 110/160 or being installed in the outside of the processor 110/160.

Explanation on the AP 100 and explanation on the STA 150 can be respectively applied to a base station and a user equipment in a different wireless communication system (e.g., LTE/LTE-A system).

The configurations of the AP and the STA as described above may be implemented such that the above-described embodiments can be independently applied or two or more thereof can be simultaneously applied, and description of redundant parts is omitted for clarity.

Figure 16:
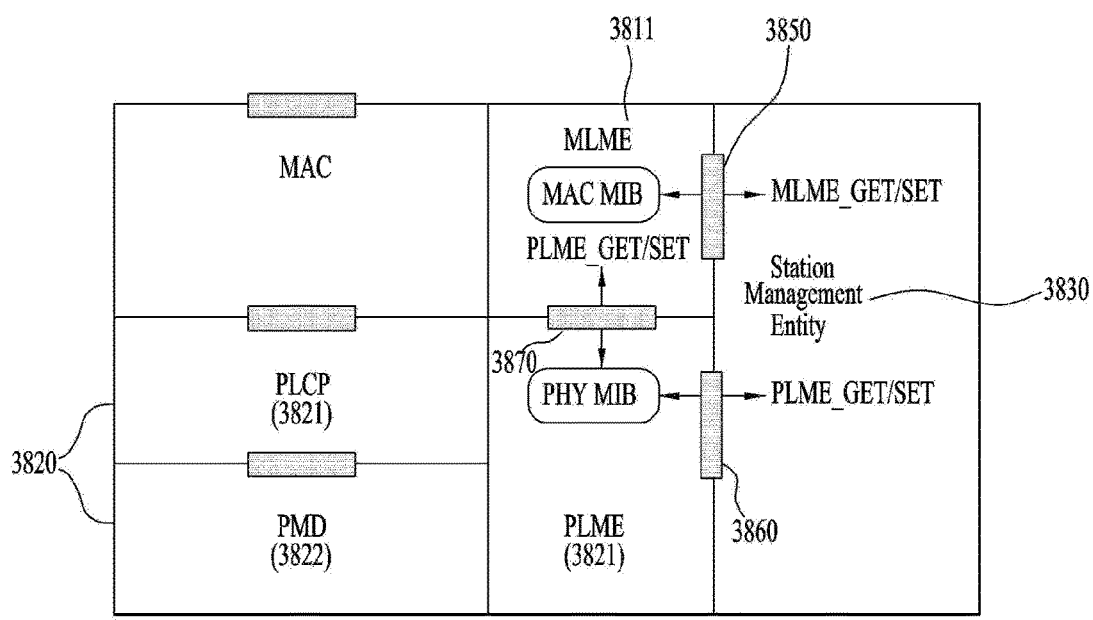
FIG. 16 is a diagram illustrating an exemplary structure of a processor of an AP device or a station device according to one embodiment of the present invention.

FIG. 16 is a diagram for an exemplary configuration of a processor of an AP or an STA according to one embodiment of the present invention.

A processor of an AP or an STA may have a structure of a plurality of layers. FIG. 16 mainly shows a MAC sublayer 3810 and a physical layer 3820 on a DLL (data link layer) among a plurality of the layers. As shown in FIG. 16, the PHY 3820 can include a PLCP (physical layer convergence procedure) entity 3821 and a PMD (physical medium dependent) entity 3822. Both the MAC sublayer 3810 and the PHY 3820 include management entities conceptually referred to as an MLME (MAC sublayer management entity) 3811. The entities 3811/3821 provide a layer management service interface in which a layer management function is operating.

In order to provide a precise MAC operation, an SME (station management entity) 3830 exists in each STA. The SME 3830 corresponds to a layer-independent entity capable of exiting in a separate management plane or capable of being seen as a separate entity (off to the side). Although precise functions of the SME 3830 are not explained in detail in the present specification, the entity 3830 is in charge of collecting lay-dependent status from various layer management entities and similarly configuring values of layer-specific parameters. In general, the SME 3830 performs the aforementioned functions on behalf of a general system management entity and may be able to implement a standard management protocol.

The entities shown in FIG. 16 interact with each other using various schemes. FIG. 16 shows several examples of exchanging GET/SET primitives. XX-GET.request is used to request a value of a given MIB attribute (management information-based attribute information). If status corresponds to "success", XX-GET.confirm primitive returns an appropriate MIB attribute information value. Otherwise, the XX-GET.confirm primitive is used to return an error indication to a status field. XX-SET.request primitive is used to request that an indicated MIB attribute is configured by a given value. If the MIB attribute corresponds to a specific operation, it indicates that the MIB attribute requests to perform the specific operation. If status corresponds to "success", XX-SET.confirm primitive confirms that an MIB attribute is configured by a requested value. Otherwise, the XX-SET.confirm primitive is used to return an error condition to a status field. If the MIB attribute corresponds to a specific operation, it confirms that the specific operation has been performed.

As shown in FIG. 16, the MLME 3811 and the SME 3830 can exchange various MLME_GET/SET primitives with each other via an MLME_SAP 3850. And, various PLCM_GET/SET primitives can be exchanged between the PLME 3821 and the SME 3830 via a PLME_SAP 3860 and can be exchanged between the MLME 3811 and the PLME 3821 via a MLME-PLME_SAP 3870.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein. The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

And, both an apparatus invention and a method invention are explained in the present specification and the explanation on the both of the inventions can be complementally applied, if necessary.

INDUSTRIAL APPLICABILITY

As mentioned in the foregoing description, embodiments of the present invention can be applied to various wireless communication systems including IEEE 802.11 system.

The invention claimed is:

1. A method for a first station (STA) to transmit a frame to a second STA in a wireless local area network (WLAN) system, the method comprising:
generating a radio frame including a first part (L-part) for a first type STA and a second part (HE-part) for a second type STA; and
transmitting the generated frame to the second STA,
wherein the first part includes a legacy short training field (L-STF), a legacy long training field (L-LTF) and a legacy signaling (L-SIG) field, and wherein a length of the L-SIG field is configured to indicate different types of the radio frame based on a remainder from a length of the L-SIG field divided by a predetermined natural number.

2. The method of claim 1, wherein the first type STA is an STA supporting an IEEE 802.11ac system and earlier versions of the IEEE 802.11ac system, and the predetermined natural number is 3.

3. The method of claim 1, wherein the length of the L-SIG field is determined by:

$$\text{Length} = \left\lceil \frac{TXTIME - 20}{4} \right\rceil \times 3 - 3 \pm m$$

wherein the "TXTIME" indicates a predetermined length determined according to lengths of each part of the radio frame, and
wherein the 'm' has a value indicating the type of the radio frame.

4. The method of claim 3, wherein the radio frame is a frame for the first type STA when the 'm' has a value of 0.

5. The method of claim 3, wherein the radio frame is a first type frame or a second type frame both for the second type STA when the 'm' has a value of 1 or 2.

6. The method of claim 5, wherein the first type frame is a general frame for the second type STA, and
wherein the second type frame is a frame for the second type STA to communicate with a transmission rate lower than a predetermined threshold.

7. The method of claim 5, wherein the first type frame includes a HE-SIG A field and a HE-SIG B field in the second part (HE-Part), and wherein the second type frame does not include the HE-SIG B field in the second part (HE-Part).

8. The method of claim 5, wherein the first type frame includes a HE-SIG A field over 2 symbols in the second part (HE-Part), and
wherein the second type frame includes the HE-SIG A field over 1 symbol in the second part (HE-Part).

9. The method of claim 8, wherein the HE-SIG A field of the second type frame is mapped on 1 symbol, and repeated over 2 symbols.

10. The method of claim 1, wherein the first part includes an RL-SIG field repeatedly transmitting the L-SIG field, and
wherein first indication information is additionally transferred by using a polarity bit or a bi-polar sequence multiplied to the RL-SIG field.

11. The method of claim 1, wherein the first part includes an RL-SIG field repeatedly transmitting the L-SIG field, and
wherein second indication information is additionally transferred by using one or more bits available in the RL-SIG field when the radio frame is transmitted for the first type STA.

12. A station device for transmitting a frame in a wireless LAN system, the station device comprising:
a processor configured to generate a radio frame including a first part (L-part) for a first type STA and a second part (HE-part) for a second type STA; and
a transceiver configured to transmit the radio frame transferred from the processor to another station,
wherein the processor generates the first part to include a legacy short training field (L-STF), a legacy long training field (L-LTF) and a legacy signaling (L-SIG) field, and wherein a length of the L-SIG field is configured to indicate different types of the radio frame based on a remainder from a length of the L-SIG field divided by a predetermined natural number.

13. The station device of claim 12, wherein the first type STA is an STA supporting an IEEE 802.11ac system and earlier versions of the IEEE 802.11ac system, and the predetermined natural number is 3.

14. The station device of claim 12, wherein the processor determines a length of the L-SIG field by:

$$\text{Length} = \left\lceil \frac{TXTIME - 20}{4} \right\rceil \times 3 - 3 \pm m$$

wherein the "TXTIME" indicates a predetermined length determined according to lengths of each part of the radio frame, and
wherein the 'm' has a specific value indicating the type of the radio frame.

15. The station device of claim 14, wherein the radio frame is a frame for the first type STA when the 'm' has a value of 0, and the radio frame is a first type frame or a second type frame both for the second type STA when the 'm' has a value of 1 or 2.

* * * * *